United States Patent
Wang et al.

(10) Patent No.: US 12,520,265 B2
(45) Date of Patent: Jan. 6, 2026

(54) DEVICE DETERMINING METHOD, ELECTRONIC DEVICE, AND COMPUTER-READABLE STORAGE MEDIUM

(71) Applicant: BEIJING XIAOMI MOBILE SOFTWARE CO., LTD., Beijing (CN)

(72) Inventors: Zihan Wang, Beijing (CN); Cheng Zheng, Beijing (CN); Shaopu Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 671 days.

(21) Appl. No.: 17/899,273

(22) Filed: Aug. 30, 2022

(65) Prior Publication Data
US 2023/0341543 A1 Oct. 26, 2023

(30) Foreign Application Priority Data
Apr. 20, 2022 (CN) .......................... 202210438564.8

(51) Int. Cl.
H04W 64/00 (2009.01)
G01S 13/72 (2006.01)
G01S 13/89 (2006.01)

(52) U.S. Cl.
CPC .............. *H04W 64/00* (2013.01); *G01S 13/72* (2013.01); *G01S 13/895* (2019.05)

(58) Field of Classification Search
CPC ...... G01S 13/895; G01S 13/72; G01S 5/0249; G01S 5/017; G01S 3/50; G01S 5/0218; G01S 11/06; G01S 3/14; H04W 64/00; H04W 4/025; H04W 4/33; H04W 24/08; H04W 8/005; H04W 4/80; H04W 76/14; H04L 12/282; H04M 1/72415
See application file for complete search history.

(56) References Cited

U.S. PATENT DOCUMENTS 11,303,041 B2 * 4/2022 Smyth .................. H01Q 3/2605
12,066,555 B1 * 8/2024 Busser .................... G01S 3/043
(Continued)

FOREIGN PATENT DOCUMENTS

| CN | 111212182 A | 5/2020 |
| KR | 20210021914 A | 3/2021 |
| KR | 20220000198 A | 1/2022 |

OTHER PUBLICATIONS

Japanese Patent Application No. 2022-134963, Office Action dated Jul. 7, 2023.
(Continued)

*Primary Examiner* — Matthew D. Anderson
*Assistant Examiner* — Michele C Douglas
(74) *Attorney, Agent, or Firm* — Cozen O'Connor

(57) ABSTRACT

A device determining method, an electronic device, and a computer-readable storage medium are provided. The method includes: determining a first angle of arrival (AOA) of a signal from a target device in a first direction and a second AOA of the signal in a second direction; acquiring a status of the signal between the terminal and the target device in response to determining that the first AOA and the second AOA are within a first preset angle range; and determining the target device as a device to be selected according to the status of the signal between the terminal and the target device.

16 Claims, 6 Drawing Sheets

(56) References Cited

U.S. PATENT DOCUMENTS

| | | | |
|---|---|---|---|
| 12,085,661 B2* | 9/2024 | Padaki | G01S 5/0268 |
| 12,174,603 B2* | 12/2024 | Qiao | G05B 19/042 |
| 2019/0128993 A1* | 5/2019 | Hiller | G01S 3/48 |
| 2021/0058740 A1* | 2/2021 | He | G01S 3/20 |
| 2022/0057471 A1* | 2/2022 | Padaki | G01S 5/0215 |
| 2022/0085850 A1* | 3/2022 | Dallal | H04B 7/043 |
| 2022/0186533 A1* | 6/2022 | Prince | G07C 9/00174 |
| 2022/0390541 A1* | 12/2022 | Chen | G01S 5/04 |
| 2023/0341543 A1* | 10/2023 | Wang | G01S 5/0249 |
| 2025/0093458 A1* | 3/2025 | Gomez Martinez | G01S 3/801 |

OTHER PUBLICATIONS

Japanese Patent Application No. 2022-134963, English translation of Office Action dated Jul. 7, 2023, 7 pages.
European Patent Application No. 22192661.1, Search and Opinion dated Aug. 24, 2023, 9 pages.
Korean Patent Application No. 10-2022-0105980, Office Action dated Dec. 26, 2023, 5 pages.
Korean Patent Application No. 10-2022-0105980, English translation of Office Action dated Dec. 26, 2023, 5 pages.

* cited by examiner

DEVICE DETERMINING METHOD, ELECTRONIC DEVICE, AND COMPUTER-READABLE STORAGE MEDIUM

CROSS-REFERENCE TO RELATED APPLICATION

This application is based upon and claims priority to Chinese Patent Application No. 202210438564.8, filed Apr. 20, 2022, the entire contents of which are incorporated herein by reference.

FIELD

The present disclosure generally relates to the field of communication technology, and more particularly, to a device determining method, an electronic device, and a computer-readable storage medium.

BACKGROUND

When using ultra wide band (UWB) for positioning, after a location of a target device is determined, and the location of the target device meets a specific condition, the target device can be selected to realize the control of the target device.

For example, after a UWB component in a mobile phone is used to position the target device, when it is determined that the target device is directly in front of the UWB component according to the positioning result, the positioned target device can be selected, and a control signal can be sent to the target device to realize the control of the target device.

At present, the way to determine that the target device is directly in front of the UWB component can be implemented according to an angle of arrival (AOA) of a signal from the target device. For example, an AOA of a signal from the target device in a horizontal direction and an AOA of the signal in a vertical direction can be determined by the UWB component. When the two AOAs satisfy specific conditions, it can be determined that the target device is directly in front of the UWB component.

However, due to some problems of UWB technology itself, in the process of determining that the device is directly in front of the UWB component, it is possible to mistakenly determine that a device in a large-angle direction is directly in front of the UWB component. For example, the device may be located at an angle of 90° (left or right) and 180° (directly behind) to the UWB component. If this device is determined as being directly in front of the UWB component, this results in the subsequent selection of a wrong device.

SUMMARY

According to a first aspect of embodiments of the present disclosure, there is provided a device determining method applied to a terminal provided with an ultra wide band (UWB) component, the method including: determining a first angle of arrival (AOA) of a signal from a target device in a first direction and a second AOA of the signal in a second direction by the UWB component, the first direction being perpendicular to the second direction; acquiring a status of the signal between the terminal and the target device in response to determining that the first AOA and the second AOA are within a first preset angle range; and determining the target device as a device to be selected according to the status of the signal between the terminal and the target device.

According to a second aspect of embodiments of the present disclosure, there is provided an electronic device, including: a processor; and a memory for storing instructions executable by the processor; in which the processor is configured to implement the above method.

According to a third aspect of embodiments of the present disclosure, there is provided a computer-readable storage medium having stored therein instructions that, when executed by a processor, cause steps in the above method to be implemented.

It is to be understood that both the foregoing general description and the following detailed description are illustrative and explanatory only and are not restrictive of the present disclosure.

BRIEF DESCRIPTION OF THE DRAWINGS

In order to illustrate the technical solutions in embodiments of the present disclosure more clearly, accompanying drawings used in the description of the embodiments will be briefly introduced below, and it is obvious that the accompanying drawings in the following description are only some embodiments of the present disclosure. For those skilled in the art, other accompanying drawings can also be obtained from these accompanying drawings without creative labor.

DETAILED DESCRIPTION

The technical solutions in embodiments of the present disclosure will be clearly and completely described below with reference to accompanying drawings in the embodiments of the present disclosure. Obviously, the described embodiments are only part of the embodiments of the present disclosure, but not all of the embodiments. Based on the embodiments in the present disclosure, all other embodiments obtained by those skilled in the art without creative labor shall fall within the protection scope of the present disclosure.

Terms used herein in the embodiments of the present disclosure are only for the purpose of describing specific embodiments, but should not be construed to limit the present disclosure. As used in the embodiments of the present disclosure and the appended claims, "a" and "the" in singular forms are intended to include plural forms, unless clearly indicated in the context otherwise. It should also be understood that the term "and/or" used herein represents and contains any one or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, a first relation may also be referred to as a second relation, and similarly, a second relation may also be referred to as a first relation, without departing from the scope of the embodiments of the present disclosure. As used herein, the term "if" may be construed to mean "when" or "upon" or "in response to determining" depending on the context.

For the purpose of brevity and ease of understanding, the terms "greater than" or "less than", "higher than" or "lower than" are used herein when characterizing the relationship of magnitude. However, for those skilled in the art, it can be understood that the term "greater than" also covers the meaning of "greater than or equal to", and the term "less than" also covers the meaning of "less than or equal to"; the term "higher than" covers "higher than or equal to", and the term "lower than" also covers the meaning of "lower than or equal to".

Figure 1:
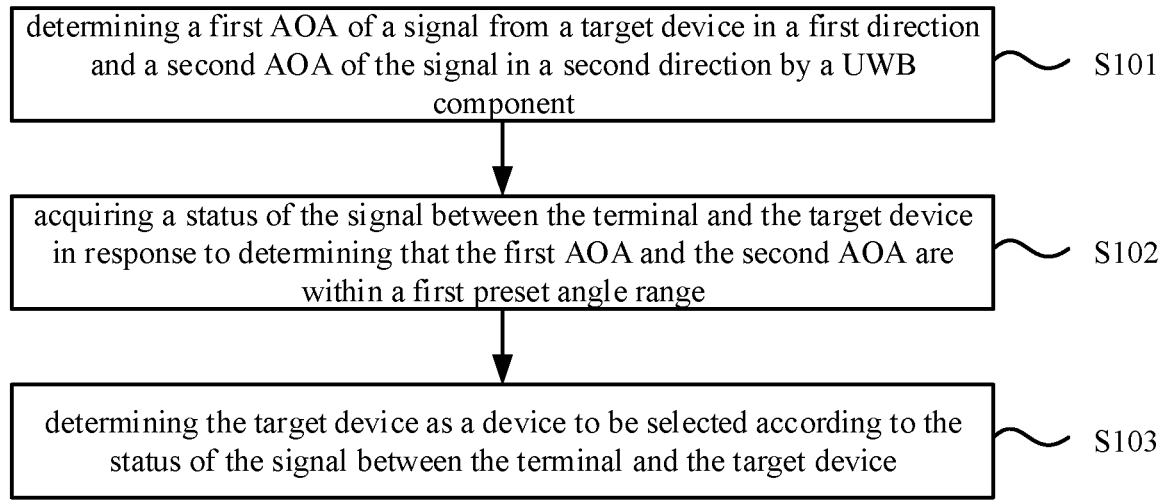
FIG. 1 is a schematic flowchart showing a device determining method according to an embodiment of the present disclosure.

FIG. 1 is a schematic flowchart showing a device determining method according to an embodiment of the present disclosure. The device determining method shown in the embodiment can be applied to a terminal. The terminal includes, but is not limited to, a communication device such as a mobile phone, a tablet computer, a wearable device, a sensor, and an Internet of Things device. The terminal may communicate with a network device. The network device includes, but is not limited to, a network device in a communication system such as 4G, 5G, and 6G, for example, a base station, a core network, and the like.

In one embodiment, an ultra wide band (UWB) module may be provided in the terminal. The UWB component may implement a positioning function by transmitting a UWB signal, for example, determining a first angle of arrival (AOA) of a signal from a target device in a first direction and a second AOA of the signal in a second direction.

In one embodiment, taking the UWB component in a mobile phone as an example, the UWB component can be disposed at a back of the mobile phone, for example, inside a rear cover of the mobile phone, and can transmit the UWB signal outward from the rear cover of the mobile phone. The UWB component may include one or more antennas or antenna arrays, in which each of the antenna arrays may include at least three antennas, and the three antennas are distributed at right angles to each other to realize the positioning function.

It should be noted that the antennas or antenna arrays in the UWB component can be disposed inside the rear cover of the mobile phone, or can be disposed in other positions, such as a multiplexed frame of the mobile phone. The position of the antennas or antenna arrays in the mobile phone can be set as desired. The embodiments of the present disclosure are mainly exemplarily illustrated in the case where the antennas or antenna arrays in the UWB component is disposed inside the rear cover of the mobile phone.

As shown in FIG. 1, the device determining method may include steps as follows:

In step S101, a first angle of arrival (AOA) of a signal from a target device in a first direction and a second AOA of the signal in a second direction are determined by the UWB component. The first direction is perpendicular to the second direction, for example, the first direction is a horizontal direction, and the second direction is a vertical direction.

In step S102, a status of the signal between the terminal (mainly referring to the UWB component) and the target device is acquired in response to determining that the first AOA and the second AOA are within a first preset angle range. For example, it can be judged whether an angle between the target device and the terminal (mainly referring to the UWB component) is within a second preset angle range according to the status of the signal.

In step S103, the target device is determined as a device to be selected according to the status of the signal between the terminal and the target device. For example, when it is determined that the angle between the target device and the terminal is within the second preset angle range according to the status of the signal, it is determined that the target device is the device to be selected.

In one embodiment, the terminal may transmit a UWB signal by the UWB component, thereby determining the first AOA in the first direction and the second AOA in the second direction of the target device, and further determining whether the first AOA and the second AOA are within the first preset angle range.

For example, the first preset angle range is within a range from −20° to 20°. When the first AOA is between −20° and 20° and the second AOA is between −20° and 20°, it can be determined that the first AOA and the second AOA are within the first preset angle range. In this case, it can generally be considered that the target device is located directly in front of the UWB component. For example, the UWB component is located in the rear cover of the mobile phone, then the target device is located directly in front of the UWB component, which means that the target device is located in a direction directly facing to the back of the mobile phone.

Figure 2:
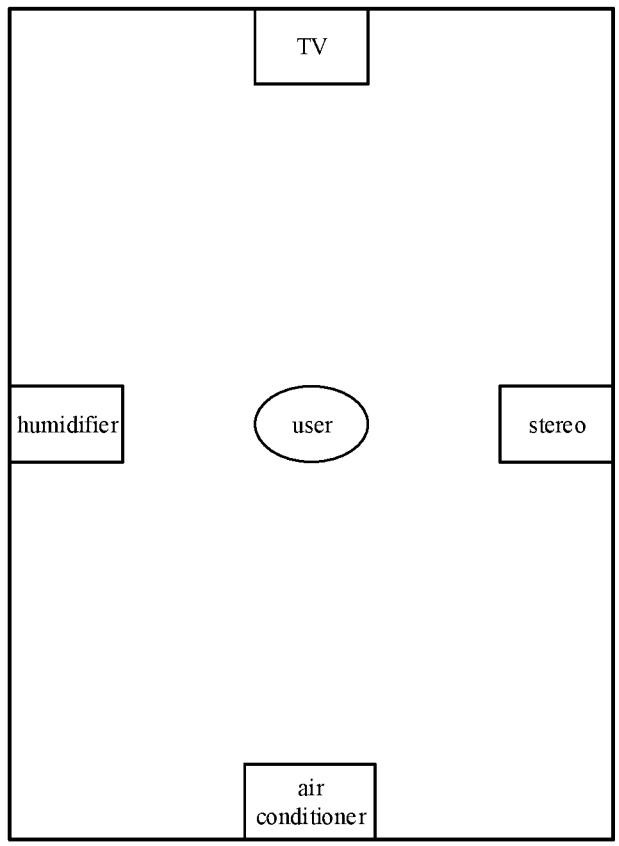
FIG. 2 is a schematic diagram showing an application scenario according to an embodiment of the present disclosure.

FIG. 2 is a schematic diagram showing an application scenario according to an embodiment of the present disclosure.

As shown in FIG. 2, for example, in an indoor scenario, a user uses a mobile phone to control an indoor device. Firstly, the device can be positioned. When it is determined that the target device is located directly in front of the UWB component in the mobile phone, it can be determined that the target device is a device to be selected, and then an operation pop-up window of the target device can pop up on a screen of the mobile phone for the user to input a control instruction. Furthermore, a control signal (a communication connection can be established with the target device in advance, or a communication connection with the target device can be established after the target device is determined as the device to be selected) is sent to the target device according to the control instruction input by the user to control the target device.

For example, in the indoor scenario shown in FIG. 2, there is a television (TV), a humidifier, a stereo, an air conditioner and other devices, and the user is located in a center position. When the user needs to control the TV, the UWB component in the mobile phone can face to the TV, for example, the UWB component is located in the rear cover of the mobile phone, then one can turn the rear cover of the mobile phone to the TV, thus selecting the TV firstly, and then controlling the TV.

It can be determined that the first AOA and the second AOA of a signal from the TV are within a first preset angle range by a UWB component pair, for example, the first AOA is between −20° and 20°, and the second AOA is between −20° and 20°. However, due to some problems of the UWB technology itself, it is possible to determine that each of the first AOA and the second AOA of a signal from a device in a large-angle direction, i.e. at a large angle to the UWB component, is also within the first preset angle range, for example, it may also be determined that the first AOA and the second AOA of signals from the humidifier and the stereo located in a 90° direction as well as the air conditioner located in a 180° direction are within the first preset angle range. Then, the mobile phone will not only determine the TV that is actually directly in front of it as the device to be selected, but also mistakenly determine the device located in the large-angle direction as the device to be selected.

According to the embodiment of the present disclosure, when it is determined that the first AOA and the second AOA of the signal from the target device are within the first preset angle range, the status of the signal between the target device and the terminal can be further determined, and then it can be determined according to the status of the signal whether the angle between the target device and the terminal is relatively small, for example whether it is within a second preset angle range. The second preset angle range can be set as desired, for example, can be set to −60° to 60° or set to an angle other than 90° or 180°.

When it is determined that the angle between the target device and the terminal is relatively small according to the status of the signal, for example, the angle between the target device and the terminal is within the second preset angle range, then the target device can be determined as a device that directly faces to the UWB component, so that the target device is determined as the device to be selected. When it is determined that the angle between the target device and the terminal is relatively large according to the status of the signal, for example, the angle between the target device and the terminal is not within the second preset angle range, then it can be determined that the target device is a device located in a 90° or 180° direction of the terminal, i.e. at an angle of 90° or 180° to the terminal, rather than a device directly facing to the UWB component, so that the target device will not be determined as the device to be selected.

Accordingly, the device located in the 90° or 180° direction of the terminal can be prevented from being misjudged as the device to be selected, which is beneficial to accurate selection of the device directly facing to the UWB component, so as to accurately carry out subsequent control of the device that the user needs to select.

In one embodiment, the status of the signal in the embodiment of the present disclosure can be characterized by at least one of the following:
whether an electromagnetic wave reflected by the target device is in line of sight transmission; for example,
whether a target probability that the electromagnetic wave reflected by the target device is in non line of sight (NLoS) transmission is less than a probability threshold;
whether a second received signal strength indication (RSSI) of the electromagnetic wave reflected by the target device is greater than a first RSSI when a distance from the target device to the terminal is a first distance;
whether a second signal-noise ratio (SNR) of the electromagnetic wave reflected by the target device is greater than a first SNR when the distance from the target device to the terminal is the first distance.

It should be understood that the status of the signal is not limited to the above-mentioned three characterization manners, and the following illustrative descriptions are mainly directed at the foregoing three manners by several embodiments.

Figure 3:
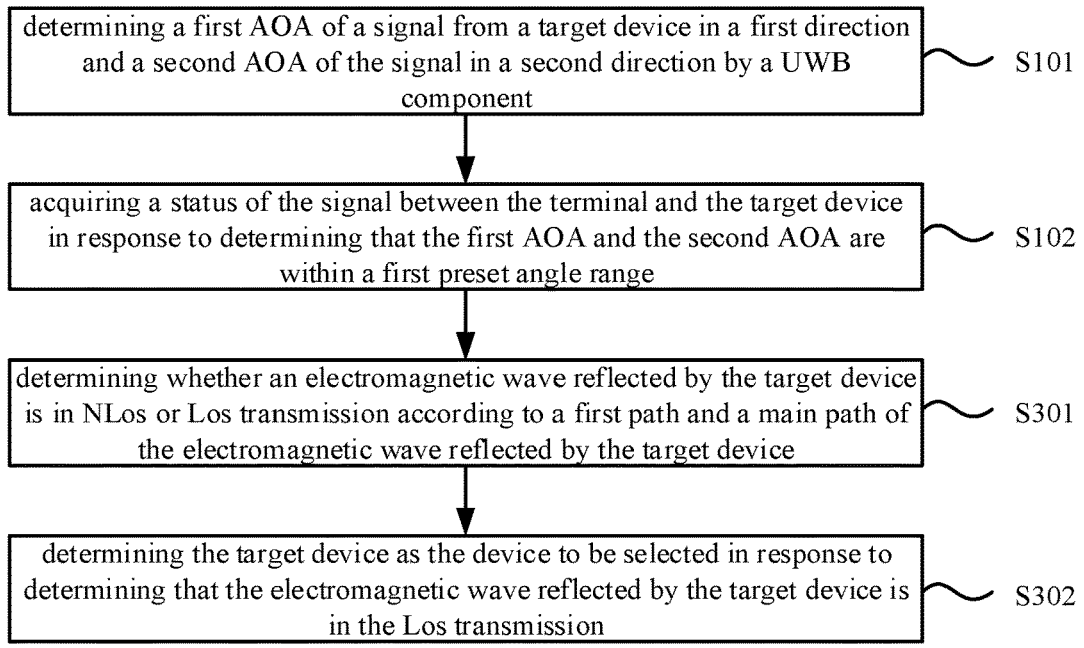
FIG. 3 is a schematic flowchart showing another device determining method according to an embodiment of the present disclosure.

FIG. 3 is a schematic flowchart showing another device determining method according to an embodiment of the present disclosure. As shown in FIG. 3, determining the target device as the device to be selected according to the status of the signal between the terminal and the target device includes steps as follows:

In step S301, it is determined whether an electromagnetic wave reflected by the target device is in NLoS or LoS transmission according to a first path and a main path of the electromagnetic wave reflected by the target device.

In step S302, the target device is determined as the device to be selected in response to determining that the electromagnetic wave reflected by the target device is in the LoS transmission.

In one embodiment, in a wireless communication system, the propagation modes of an electromagnetic wave (for example, a UWB signal, a pulse signal light) are mainly divided into two modes, one is in line of sight (Los) transmission, and the other is in non line of sight (NLoS) transmission.

In the case of the LoS transmission, there is no obstacle between the terminal and the target device, and the electromagnetic wave transmitted from the terminal can be directly transmitted to the target device. In this case, the time delay of the terminal receiving the electromagnetic wave reflected by the target device is relatively short, and the energy loss is relatively small.

In the case of the NLoS transmission, there is an obstacle between the terminal and the target device, and the electromagnetic wave transmitted from the terminal can be transmitted to the target device through the obstacle or after reflected by the obstacle. In this case, the time delay of the terminal receiving the electromagnetic wave reflected by the target device is relatively long, and the energy loss is relatively large.

It is found after research that the two cases of the LoS transmission and the NLoS transmission correspond to the two cases considered in the embodiment of the present disclosure, that is, the case where the angle between the target device and the terminal is relatively small and the case where the angle between the target device and the terminal is relatively large.

When the angle between the target device and the terminal is relatively small, for example, when the UWB component of the terminal directly faces to the target device, generally there is no obstacle between the UWB component and the target device, and direct transmission from the UWB component to the target device belongs to the case of the LoS transmission.

When the angle between the target device and the terminal is relatively large, for example, when the target device is in a 180° direction of the UWB component, that is, in a direction facing away from the UWB component, there is a user as an obstacle between the UWB component and the target device. For example, when the target device is in a 90° direction of the UWB component, that is, to the left or right of the UWB component, there is a user's hand as the obstacle between the UWB component and the target device. In this case, the transmission from the UWB component to the target device belongs to the case of the NLoS transmission.

Therefore, in this embodiment, it is judged whether the angle between the target device and the terminal is relatively small according to whether the electromagnetic wave reflected by the target device is in the NLoS or LoS transmission. For example, when it is determined that the electromagnetic wave reflected by the target device is in the LoS transmission, it can be determined whether the angle between the target device and the terminal is relatively small, for example, within or not within the second preset angle range, thus determining the target device as the device to be selected.

It can be judged whether the electromagnetic wave reflected by the target device is in the NLoS or LoS transmission according to the channel impulse response in this embodiment.

Figure 4A:
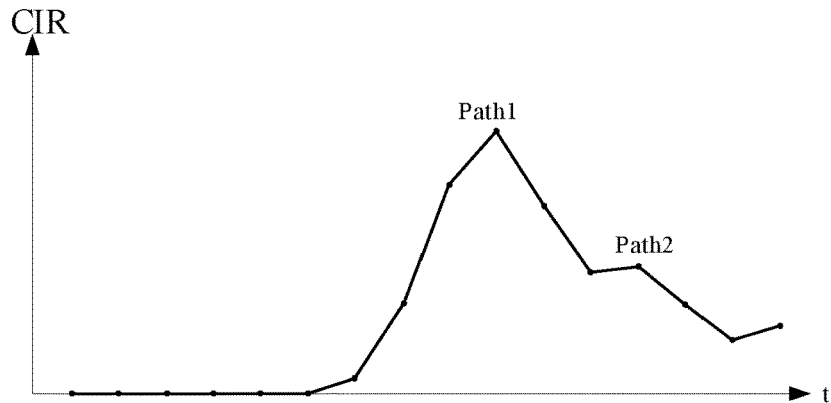
FIG. 4A is a schematic diagram showing a channel impulse response according to an embodiment of the present disclosure.
Figure 4B:
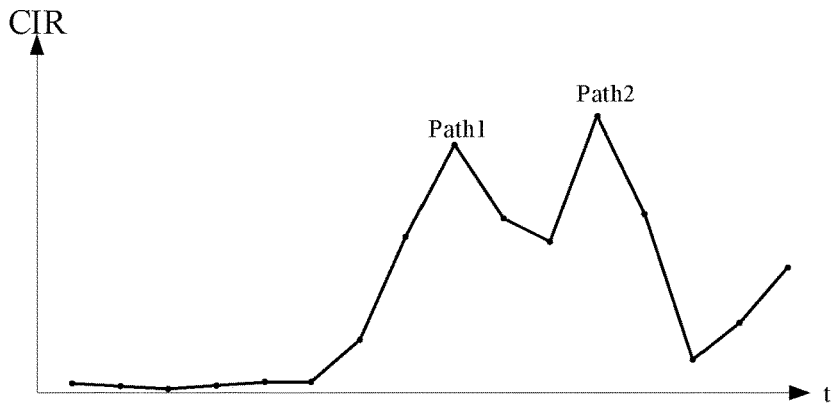
FIG. 4B is a schematic diagram showing another channel impulse response according to an embodiment of the present disclosure.

FIG. 4A is a schematic diagram showing a channel impulse response according to an embodiment of the present disclosure. FIG. 4B is a schematic diagram showing another channel impulse response according to an embodiment of the present disclosure.

In one embodiment, an electromagnetic wave module can be provided in the terminal for transmitting an electromagnetic wave. Taking transmission of a pulse signal as an example, the electromagnetic wave module may be located in the rear cover of the terminal, and configured to transmit the pulse signal (in a direction that can be the same as a UWB signal transmitting direction of the UWB component), and receive the pulse signal reflected by the target device as a channel impulse response (CIR), thus analyzing the CIR.

In all embodiments of the present disclosure, the relationship between the electromagnetic wave module and the target device may be the same as the relationship between the UWB component and the target device.

In FIGS. 4A and 4B, a vertical axis represents the energy amplitude of the CIR, and a horizontal axis represents time when the CIR is received. Generally, two paths of the pulse signal transmission, Path1 and Path2, are mainly analyzed. A path with the shortest CIR time delay is called a first path, and a path with the highest CIR energy is called a main path.

As shown in FIG. 4A, the Path1 has the highest energy and the shortest time delay, so the Path1 is both the first path and the main path. As can be seen from the analysis, since there is no obstacle between the terminal and the target device in the LoS transmission scenario, the CIR of the target device with respect to the pulse signal transmitted by the terminal generally meets the case shown in FIG. 4A.

As shown in FIG. 4B, the Path1 has the shortest time delay, so the Path1 is the first path, and the Path2 has the highest energy, so Path2 is the main path. It can be seen from the analysis that, since there is an obstacle between the terminal and the target device in the NLoS transmission scenario, the CIR of the target device with respect to the pulse signal transmitted by the terminal generally meets the case shown in FIG. 4B.

Therefore, when the Path1 is the first path, Amp_Path1 represents the energy amplitude of the CIR on the Path1, and Amp_Path2 represents the energy amplitude of the CIR on the Path2. When Amp_Path1>Amp_Path2, the transmission of the electromagnetic wave between the terminal and the target device is the LoS transmission. When Amp_Path1≤Amp_Path2, the transmission of the electromagnetic wave between the terminal and the target device is the NLoS transmission.

Therefore, it is determined whether the electromagnetic wave reflected by the target device is in the NLoS or LoS transmission according to the first path and the main path of the electromagnetic wave reflected by the target device in this embodiment.

In some embodiments, determining the target device as the device to be selected in response to determining that the electromagnetic wave reflected by the target device is in the LoS transmission includes: determining a target probability that the electromagnetic wave reflected by the target device is in the NLoS transmission according to a result of determining whether the electromagnetic wave reflected by the target device is in the NLoS or LoS transmission for multiple times (for example, 100 times to 1000 times); and determining the target device as the device to be selected when the target probability is less than a probability threshold.

Since there may be a large error in determining whether the transmission scenario is in the NLoS or LoS transmission only according to the result of one reflection, in this embodiment, a result of determining whether the electromagnetic wave reflected by the target device is in the NLoS or LoS transmission for multiple times is obtained, and the target probability that the electromagnetic wave reflected by the target device is in the NLoS transmission is determined according to the result of multiple determinations. Then, it is determined whether the angle between the target device and the terminal is relatively small, for example, whether it is within or not within the second preset angle range, according to the relationship between the target probability and the probability threshold.

When a first relation is that the target probability is less than the probability threshold, a larger probability can be determined that the terminal and the target device is in the LoS transmission, so there is a larger probability of belonging to the case where the UWB component directly faces to the target device, thus determining that the angle between the terminal and the target device is relatively small, for example, within the second preset angle range.

When the first relation is that the target probability is greater than or equal to the probability threshold, a larger probability can be determined that the terminal and the target device is in the NLoS transmission, so there is a larger probability of belonging to the case that the UWB component does not directly face to the target device, but the target device is located in a 90° or 180° direction of the UWB component, thus determining that the angle between the terminal and the target device is relatively large, for example, not within the second preset angle range.

Figure 5:
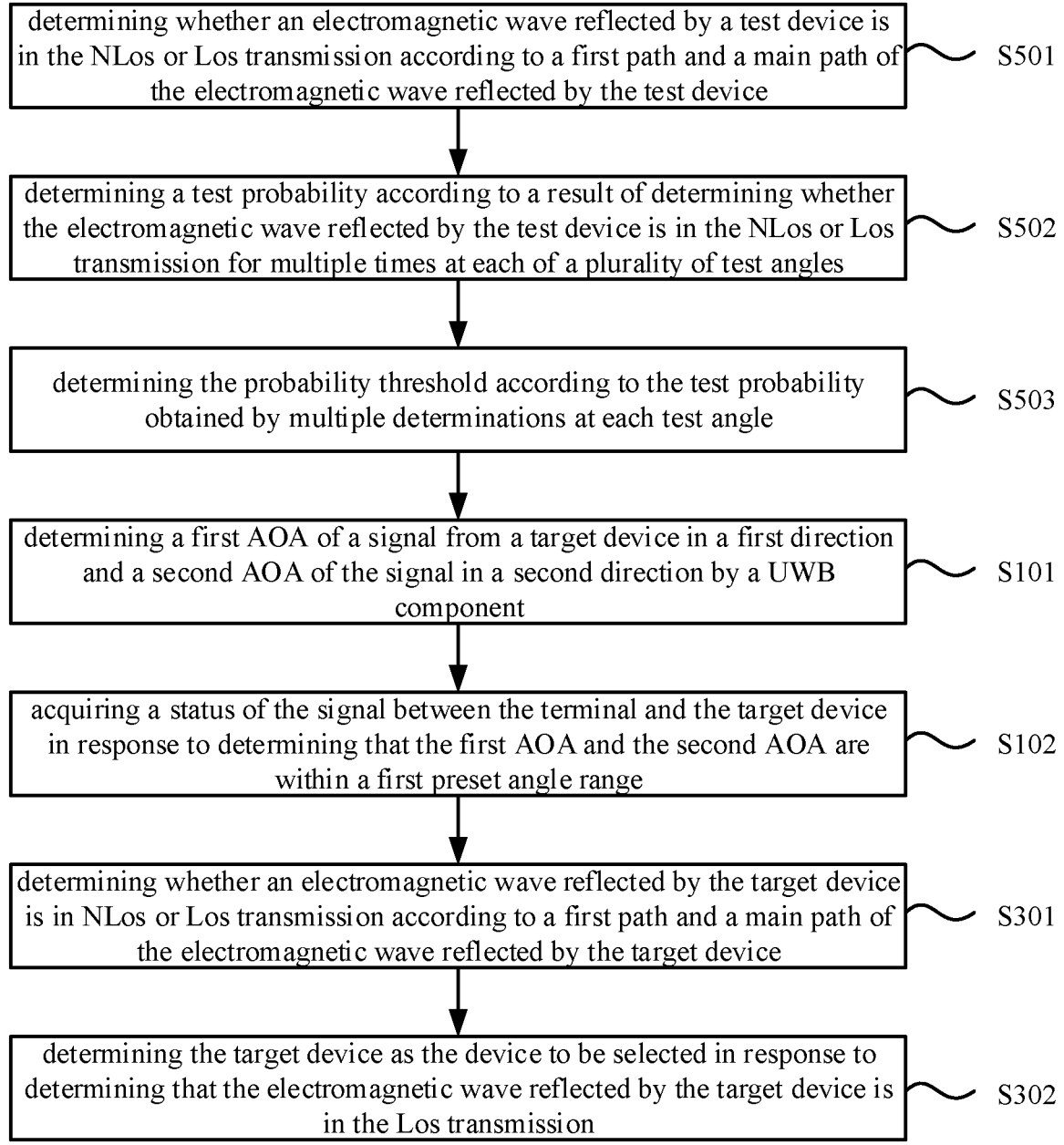
FIG. 5 is a schematic flowchart showing yet another device determining method according to an embodiment of the present disclosure.

FIG. 5 is a schematic flowchart showing yet another device determining method according to an embodiment of the present disclosure. As shown in FIG. 5, the method further includes steps as follows:

In step S501, it is determined whether an electromagnetic wave reflected by a test device is in the NLoS or LoS transmission according to a first path and a main path of the electromagnetic wave reflected by the test device.

In step S502, a test probability is determined according to a result of determining whether the electromagnetic wave reflected by the test device is in the NLoS or LoS transmission for multiple times at each of a plurality of test angles.

In step S503, the probability threshold is determined according to the test probability obtained by multiple determinations at each test angle.

In one embodiment, the can be set as desired, and one or more probability thresholds may be set. For example, when a plurality of probability thresholds is set, the corresponding probability threshold can be selected according to the environment in which the terminal is located.

In one embodiment, the test device may be taken as an object to determine whether the terminal and the test device are in the NLoS or LoS transmission. For example, it is determined whether the electromagnetic wave reflected by the test device is in the NLoS or LoS transmission according to the first path and the main path of the electromagnetic wave reflected by the test device.

The test angle between the electromagnetic wave module and the test device can then be adjusted, for example, from −180° to 180°, by 30° each time. Each time the angle is adjusted, the electromagnetic wave is transmitted several times, and a result of determining whether the electromagnetic wave reflected by the test device each time is in the NLoS or LoS transmission is counted to determine the test probability that the transmission between the test device and the terminal is judged to be the NLoS transmission. Thus, the test probability corresponding to each angle is obtained, and then the probability threshold is determined according to the test probability obtained by multiple determinations at each test angle.

For example, the test probability corresponding to each angle is shown in Table 1:

TABLE 1

| Angle (°) | −180 | −150 | −120 | −90 | −60 | −30 | 0 | 30 | 60 | 90 | 120 | 150 | 180 |
|---|---|---|---|---|---|---|---|---|---|---|---|---|---|
| Test probability | 0.98 | 1 | 1 | 0.11 | 0 | 0 | 0 | 0 | 0 | 0.05 | 0.98 | 0.97 | 0.98 |

It can be seen by analyzing Table 1 that the test probability that the transmission between the terminal and the test device is judged to be the NLoS transmission is 0 in a small angle range of −60° to 60°, while the transmission between the terminal and the test device is probably judged to be the NLoS transmission in a large angle range of −90° to −180° and 90° to 180°. A probability, for example, 80%, can then be determined as the probability threshold in a test probability interval corresponding to −90° to −180° and 90° to 180°.

Accordingly, it is possible to determine whether the angle between the target device and the terminal is relatively small or relatively large by analyzing the transmission scenario between the target device and the terminal, thus avoiding taking the target device as the device to be selected when the angle between the target device and the terminal is relatively large.

Figure 6:
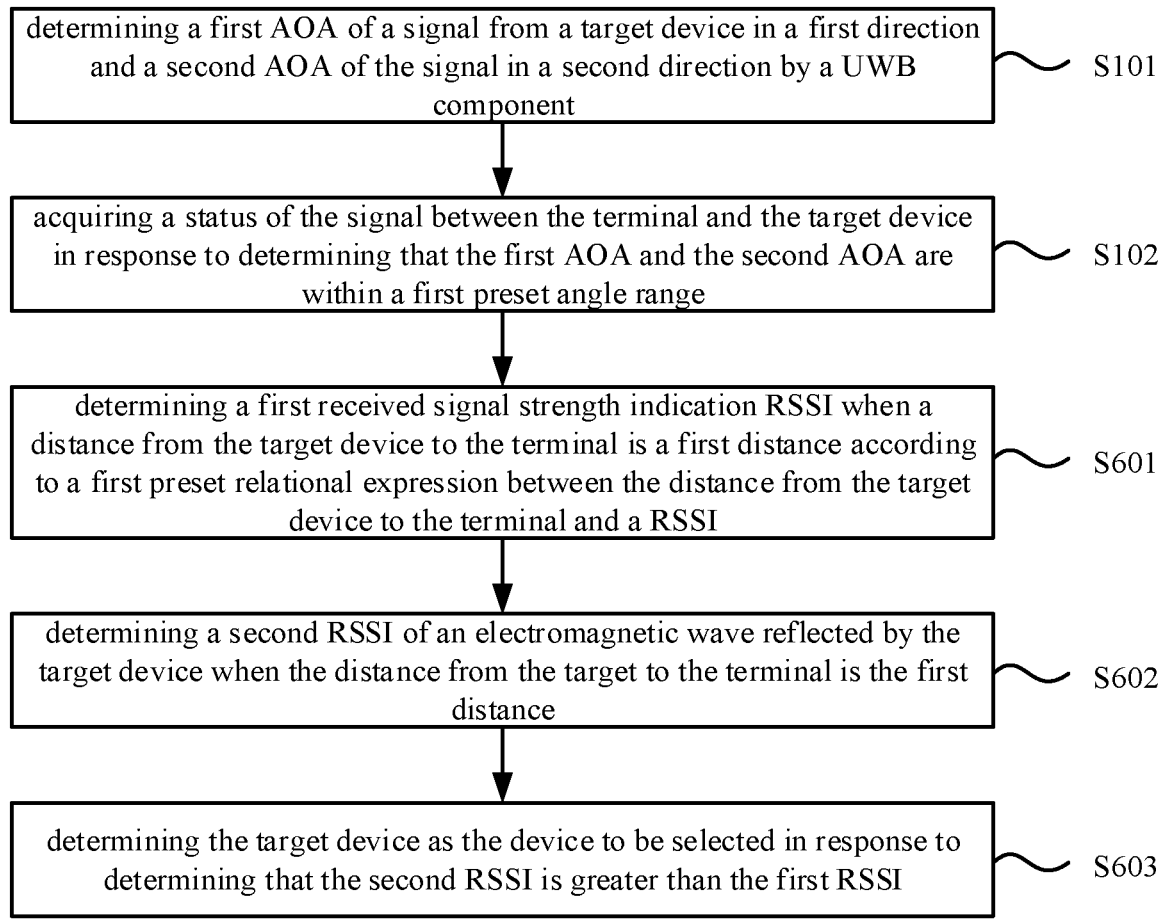
FIG. 6 is a schematic flowchart showing yet another device determining method according to an embodiment of the present disclosure.

FIG. 6 is a schematic flowchart showing yet another device determining method according to an embodiment of the present disclosure. As shown in FIG. 6, determining the target device as the device to be selected according to the status of the signal between the terminal and the target device includes steps as follows:

In step S601, a first received signal strength indication RSSI when a distance from the target device to the terminal is a first distance is determined according to a first preset relational expression between the distance from the target device to the terminal and a RSSI, in which the first preset relational expression is configured to distinguish a RSSI corresponding to a distance from the target device to the terminal when an angle is relatively small from a RSSI corresponding to the distance from the target device to the terminal when the angle is relatively large.

In step S602, a second RSSI of an electromagnetic wave reflected by the target device is determined when the distance from the target device to the terminal is the first distance.

In step S603, the target device is determined as the device to be selected in response to determining that the second RSSI is greater than the first RSSI.

In one embodiment, the method further includes: counting a first relation between an RSSI of an electromagnetic wave reflected by a test device and the distance from the target device to the terminal when an electromagnetic wave module directly faces to the test device, and a second relation between an RSSI of the electromagnetic wave reflected by the test device and the distance from the target device to the terminal when the electromagnetic wave module faces away from the test device; and determining the first preset relational expression according to the first relation and the second relation, in which the first preset relational expression is at least configured to distinguish the first relation from the second relation.

In one embodiment, the meaning of the RSSI is the received signal strength indication, which is used to measure the strength of the received signal. In the scenario of the present disclosure, the electromagnetic wave module in the terminal can transmit an electromagnetic wave signal to the target device and receive an electromagnetic wave (for example, a UWB signal, a pulse signal) reflected by the target device. The RSSI of the received electromagnetic wave signal is related to parameters such as an angle, a distance or the like between the target device and the terminal.

Still taking the electromagnetic wave module disposed in the rear cover of the mobile phone as an example, the electromagnetic wave module can transmit the electromagnetic wave signal outward toward the back of the mobile phone. When the target device is located on the back side of the mobile phone, the electromagnetic wave signal reflected by the target device can be directly transmitted to the electromagnetic wave module, so the intensity is relatively high and the RSSI is relatively large. When the target device is located on the screen side of the mobile phone, the electromagnetic wave signal reflected by the target device will first pass through the screen, resulting in a certain degree of attenuation, so the intensity is relatively low and the RSSI is relatively small.

In addition, the RSSI is not only related to the angle between the target device and the terminal, but also related to the distance between the target device and the terminal. For example, the greater the distance between the target device and the terminal, the more the signal attenuation, and the RSSI is relatively small; the smaller the distance between the target device and the terminal, the less the signal attenuation, and the RSSI is relatively large.

Therefore, the relationship between the RSSI and the distance between a device and the terminal can be determined in the case of different angles between the device and the terminal, and analysis is performed accordingly.

For example, taking a test device as an object, when the angle between the terminal and the test device is relatively small, for example, when it is within the second preset angle range, for example, when an electromagnetic wave module in the terminal directly faces to the test device, a first relation is counted between an RSSI of an electromagnetic wave reflected by the test device for multiple times and the distance from the target device to the terminal. When the angle between the terminal and the test device is relatively large, for example, when it is not within the second preset angle range, for example, when the electromagnetic wave module faces away from the test device, a second relation is counted between an RSSI of the electromagnetic wave reflected by the test device for multiple times and the distance from the target device to the terminal.

Then, the determined first relation can characterize the relationship between the RSSI of the electromagnetic wave reflected by the device and the distance when the electromagnetic wave module in the terminal directly faces to the device (the UWB component also directly faces to the device), and the second relation can characterize the relationship between the RSSI of the electromagnetic wave reflected by the device and the distance when the electromagnetic wave module in the terminal faces away from the device (the UWB component also faces away from the device).

Figure 7:
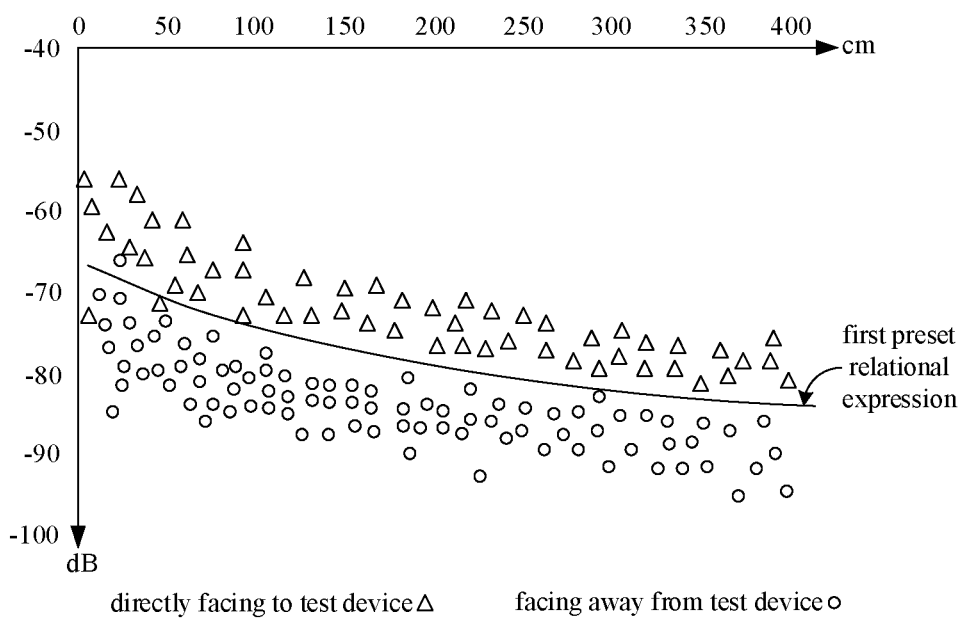
FIG. 7 is a schematic diagram showing a first relation and a second relation according to an embodiment of the present disclosure.

FIG. 7 is a schematic diagram showing a first relation and a second relation according to an embodiment of the present disclosure.

For example, as shown in FIG. 7, the abscissa represents the distance, in centimeter; and the ordinate represents the amplitude of the RSSI, in dB. As can be seen from FIG. 7, there is a clear difference between the first relation between the RSSI of the electromagnetic wave reflected by the test device and the distance when the electromagnetic wave module in the terminal directly faces to the test device and the second relation between the RSSI of the electromagnetic wave reflected by the test device and the distance when the electromagnetic wave module in the terminal faces away from the test device. Therefore, a relationship, for example, referred to as a first preset relational expression, can be determined according to the first relation and the second relation, and configured to distinguish the first relation and the second relation from each other.

For example, a plurality of demarcation points between the first relation and the second relation can be determined and fitted, and the obtained fitting function can be used as the first preset relational expression.

In one embodiment, the first preset relational expression includes:

$$Y(d) = -98 - 10 * \ln((d+100)/2000);$$

where $Y(d)$ represents the first RSSI, and $d$ represents the distance from the target device to the terminal.

As shown in FIG. 7, the first preset relational expression can relatively well distinguish the first relation from the second relation.

Therefore, when the distance between the target device and the terminal (for example, determined according to the UWB signal transmitted by the UWB component) is a first distance, the first RSSI can be calculated according to the first preset relational expression. When the distance between the target device and the terminal is the first distance, the second RSSI (i.e., the actually measured RSSI) of the electromagnetic wave reflected by the target device is p determined. Further, it can be determined whether the second RSSI is greater than the first RSSI.

When the second RSSI is greater than the first RSSI, it can be determined that the second RSSI is above the first preset relational expression shown in FIG. 7. The relationship between the RSSI of the electromagnetic wave reflected by the test device and the distance from the target device to the terminal belongs to the first relation, and the first relation is the relationship between the RSSI of the electromagnetic wave reflected by the device and the distance from the target device to the terminal when the UWB component in the terminal directly faces to the device. Therefore, it can be determined that the angle between the target device and the terminal is relatively small, for example, within the second preset angle range, for example, it is specifically determined that the UWB component in the terminal directly faces to the target device.

When the second RSSI is smaller than the first RSSI, it can be determined that the second RSSI is below the first preset relational expression shown in FIG. 7. The relationship between the RSSI of the electromagnetic wave reflected by the test device and the distance from the target device to the terminal belongs to the second relation, and the second relation is the relationship between the RSSI of the electromagnetic wave reflected by the device and the distance from the target device to the terminal when the UWB component in the terminal faces away from the device. Therefore, it can be determined that the angle between the target device and the terminal is relatively large, for example, not within the second preset angle range, for example, it is specifically determined that the UWB component in the terminal faces away from the target device.

For the case where the second RSSI is equal to the first RSSI, it can be classified into one of the above two cases as needed.

Accordingly, it is possible to determine whether the angle between the target device and the terminal is relatively large or relatively small by analyzing the RS SI of the electromagnetic wave reflected by the target device, thus avoiding taking the target device as the device to be selected when the angle between the target device and the terminal is relatively large (not within the second preset angle range).

Figure 8:
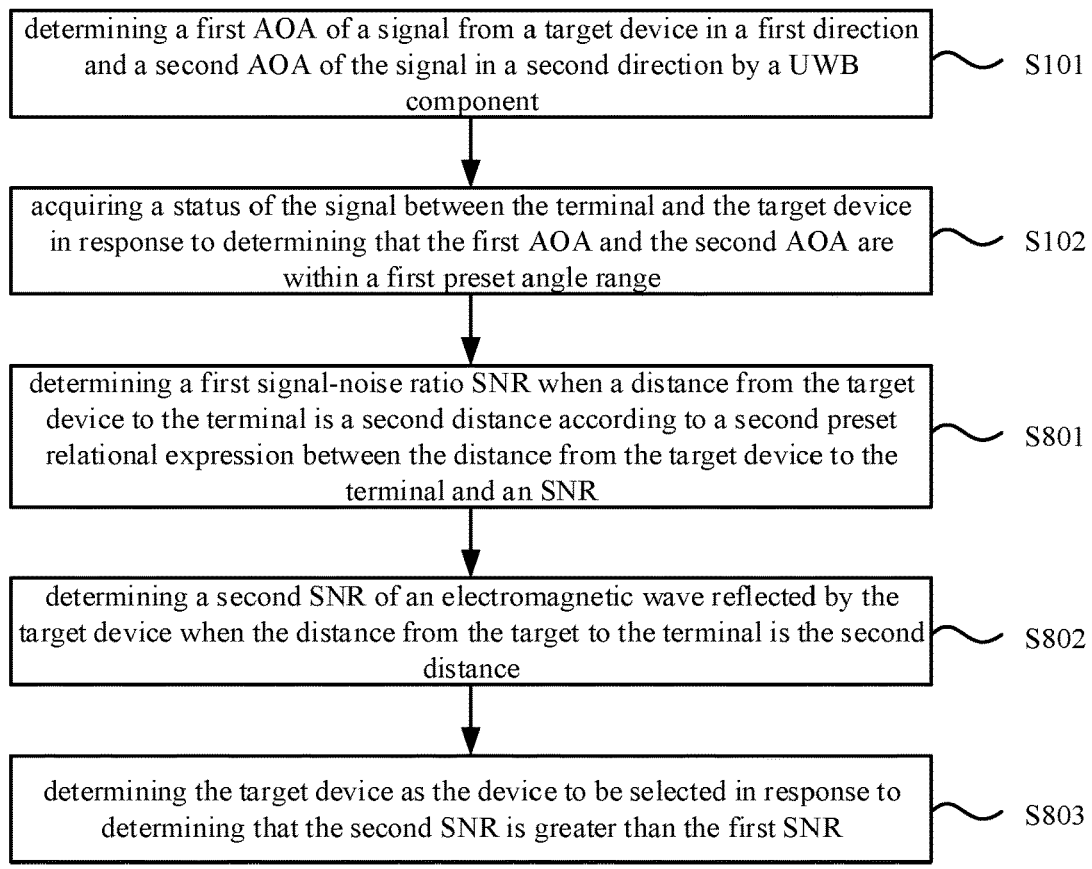
FIG. 8 is a schematic flowchart showing yet another device determining method according to an embodiment of the present disclosure.

FIG. 8 is a schematic flowchart showing yet another device determining method according to an embodiment of the present disclosure. As shown in FIG. 8, determining the target device as the device to be selected according to the status of the signal between the terminal and the target device includes steps as follows:

In step S801, a first signal-noise ratio (SNR) when a distance from the target device to the terminal is a second distance is determined according to a second preset relational expression between the distance from the target device to the terminal and an SNR, in which the second preset relational expression is configured to distinguish an SNR corresponding to the distance from the target device to the terminal when the angle is relatively small from an SNR corresponding to the distance from the target device to the terminal when the angle is relatively large.

In step S802, a second SNR of an electromagnetic wave reflected by the target device is determined when the distance from the target device to the terminal is the second distance.

In step S803, the target device is determined as the device to be selected when the second SNR is greater than the first SNR.

In one embodiment, the method further includes: counting a third relation between an SNR of an electromagnetic wave reflected by a test device and the distance from the target device to the terminal at each of a plurality of test angles to obtain a plurality of the third relations corresponding to the plurality of test angles; and determining the second preset relational expression according to the plurality of the third relations, in which the second preset relational expression is at least configured to distinguish a third relation corresponding to a relatively small angle from a third relation corresponding to a relatively large angle.

In one embodiment, the meaning of the SNR is the signal-noise ratio of a received signal, which is used to measure the signal quality of the received signal. In the scenario of the present disclosure, the electromagnetic wave module in the terminal can transmit an electromagnetic wave signal to the target device and receive an electromagnetic wave (for example, a UWB signal, a pulse signal) reflected by the target device. The SNR of the received electromagnetic wave signal is related to parameters such as an angle, a distance or the like between the target device and the terminal.

Still taking the electromagnetic wave module disposed in the rear cover of the mobile phone as an example, the electromagnetic wave module can transmit an electromagnetic wave signal outward toward the back of the mobile phone. When the target device is located on the back side of the mobile phone, the electromagnetic wave signal reflected by the target device can be directly transmitted to the electromagnetic wave module, and thus the intensity is relatively high, the gain of an automatic gain adjustment circuit inside the terminal chip will be reduced, and the noise will be reduced, so the SNR will be relatively high. When the target device is located on the screen side of the mobile phone, the electromagnetic wave signal reflected by the target device will first pass through the screen. As a result, a certain degree of attenuation is generated, so the intensity is relatively low, the gain of the automatic gain adjustment circuit inside the terminal chip will increase, the noise will become larger, and the SNR will be relatively low.

In addition, the SNR is not only related to the angle between the target device and the terminal, but also related to the distance between the target device and the terminal. For example, the greater the distance between the target device and the terminal, the more the signal attenuation, and the SNR is relatively low; the smaller the distance between the target device and the terminal, the less the signal attenuation, and the SNR is relatively high.

Therefore, the relationship between the SNR and the distance between the device and the terminal can be determined in the case of different angles between the device and the terminal, and analysis is performed accordingly.

For example, taking the test device as an object, the test angle between the terminal and the test device can be adjusted, and the third relation between the SNR of the electromagnetic wave reflected by the test device and the distance from the target device to the terminal can be counted at each of a plurality of test angles to obtain a plurality of the third relations corresponding to the plurality of test angles.

Then, among the plurality of the third relations determined, some of the third relations can characterize the relationship between the SNR of the electromagnetic wave reflected by the device and the distance when the angle between the terminal and the test device is relatively small, for example, within the second preset angle range, for example, when the electromagnetic wave module in the terminal directly faces to the device (the UWB component also directly faces to the device). The others of the third relations can characterize the relationship between the SNR of the electromagnetic wave reflected by the device and the distance when the angle between the terminal and the test device is relatively large, for example, not within the second preset angle range, for example, when the electromagnetic wave module in the terminal faces away from the device (the UWB component also faces away from the device).

Figure 9:
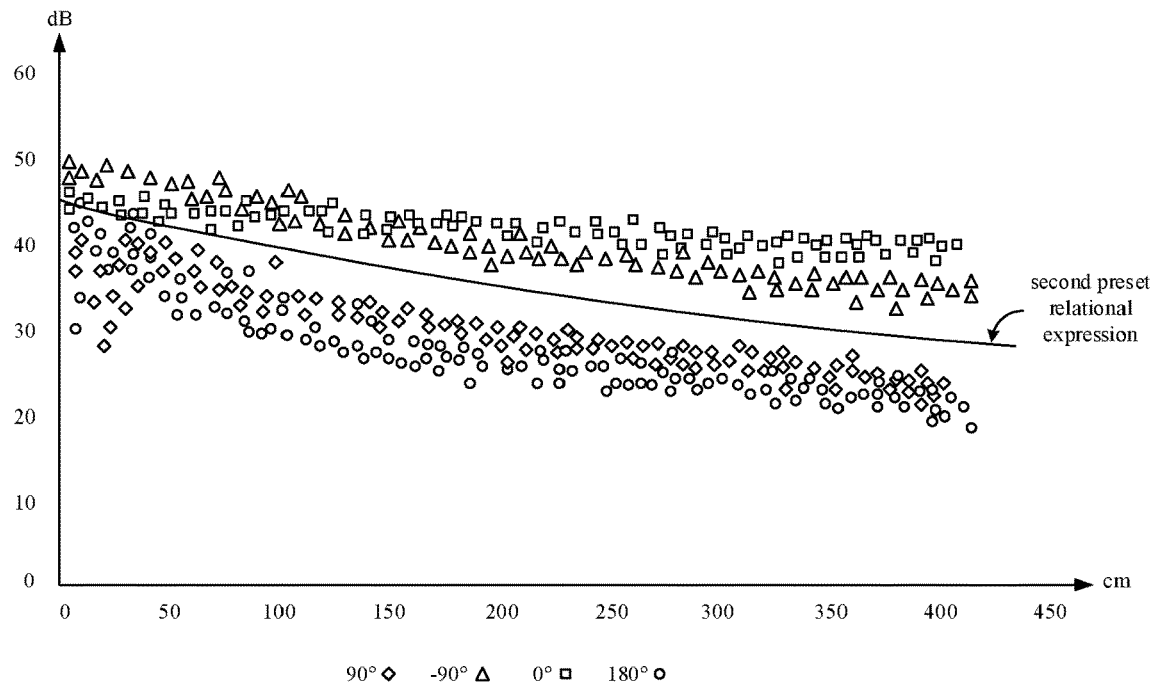
FIG. 9 is a schematic diagram showing a plurality of third relations according to an embodiment of the present disclosure.

FIG. 9 is a schematic diagram showing a plurality of third relations according to an embodiment of the present disclosure.

For example, as shown in FIG. 9, the abscissa represents the distance, in centimeter; and the ordinate represents the amplitude of the SNR, in dB. The test angles of 0°, 90°, 180°, and −90° are taken as examples. It can be seen from FIG. 9 that there is a clear difference between the third relation between the SNR of the electromagnetic wave reflected by the test device and the distance when the angle is relatively small, for example, when the angle between the electromagnetic wave module and the device is 0° or −90°, and the third relation between the SNR of the electromagnetic wave reflected by the test device and the distance when the angle is relatively large, for example, when the angle between the electromagnetic wave module and the device is 90° or 180°. Therefore, a relationship, for example, referred to as a second preset relational expression, can be determined according to the third relation between the SNR of the electromagnetic wave reflected by the test device and the distance when the angle between the electromagnetic wave module and the device is 0° or −90° and the third relation between theSNR of the electromagnetic wave reflected by the test device and the distance when the angle between the electromagnetic wave module and the device is 90° or 180°, and configured to distinguish the third relation when the angle is relatively small from the third relation when the angle is relatively large.

For example, a plurality of demarcation points between two kinds of the third relations can be determined and fitted, and the obtained fitting function may be used as the second preset relational expression.

In one embodiment, the second preset relational expression includes:

$$Z(d)=45-18/400*d;$$

where $Z(d)$ represents the first SNR, and $d$ represents the distance from the target device to the terminal.

As shown in FIG. 9, the second preset relational expression can relatively well distinguish the third relation when the angle is relatively small from the third relation when the angle is relatively large.

Therefore, when the distance between the target device and the terminal (for example, determined according to the UWB signal transmitted by the UWB component) is a second distance, the first SNR can be calculated according to the second preset relational expression. When the distance between the target device and the terminal is the second distance, the second SNR (i.e., the actually measured SNR) of the electromagnetic wave reflected by the target device is determined. Further, it can be determined whether the second SNR is greater than the first SNR.

When the second SNR is greater than the first SNR, it can be determined that the second SNR is above the second preset relational expression shown in FIG. 9 and belongs to the case where the angle between the electromagnetic wave module and the device is 0° or −90°. Then, it can be determined that the angle between the target device and the terminal is relatively small, for example, within the second preset angle range.

When the second SNR is smaller than the first SNR, it can be determined that the second SNR is below the second preset relational expression shown in FIG. 9 and belongs to the case where the angle between the electromagnetic wave module and the device is 90° or 180°. Then, it can be determined that the angle between the target device and the terminal is relatively large, for example, not within the second preset angle range.

For the case where the second SNR is equal to the first SNR, it can be classified into one of the above two cases as needed.

Accordingly, it is possible to determine whether the angle between the target device and the terminal is relatively small or relatively large by analyzing the SNR of the electromagnetic wave reflected by the target device, thus avoiding taking the target device as the device to be selected when the angle between the target device and the terminal is relatively large (not within the second preset angle range).

Corresponding to the above embodiments of the device determining method, the present disclosure also provides embodiments of a device determining apparatus.

Figure 10:
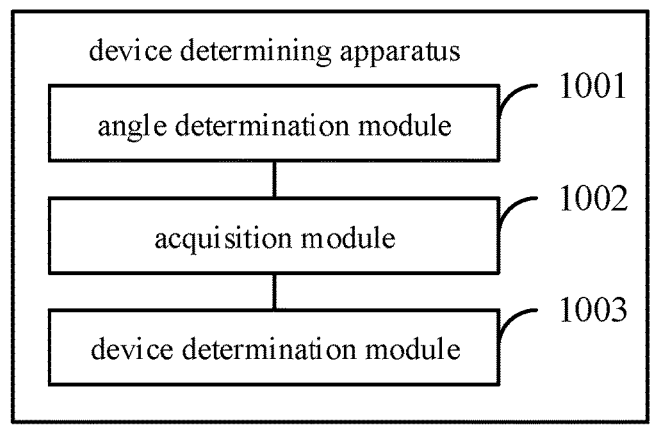
FIG. 10 is a schematic block diagram showing a device determining apparatus according to an embodiment of the present disclosure.

FIG. 10 is a schematic block diagram showing a device determining apparatus according to an embodiment of the present disclosure. The device determining apparatus shown in the embodiment can be applied to a terminal, which includes, but is not limited to, a communication device such as a mobile phone, a tablet computer, a wearable device, a sensor, and an Internet of Things device. The terminal may communicate with a network device, and the network device includes, but is not limited to a network device in a communication system such as 4G, 5G, and 6G, such as a base station, a core network, and the like.

In one embodiment, an ultra wide band UWB component may be provided in the terminal, and the UWB component may implement a positioning function by transmitting a UWB signal, for example, determining a first angle of arrival (AOA) of a signal from a target device in a first direction and a second AOA of the signal in a second direction.

In one embodiment, taking the UWB component in a mobile phone as an example, the UWB component can be disposed at a back of the mobile phone, for example, inside a rear cover of the mobile phone, and can transmit the UWB signal outward from the rear cover of the mobile phone. The UWB component may include one or more antennas or antenna arrays, in which each of the antenna arrays may include at least three antennas, and the three antennas are distributed at right angles to each other to realize the positioning function.

It should be noted that the antennas or antenna arrays in the UWB component can be disposed inside the rear cover of the mobile phone, or can be disposed in other positions, such as a multiplexed frame of the mobile phone. The position of the antennas or antenna arrays in the mobile phone can be set as desired. The embodiment of the present disclosure is mainly exemplarily illustrated in the case where the antennas or antenna arrays in the UWB component is disposed inside the rear cover of the mobile phone.

As shown in FIG. 10, the device determining apparatus may include an angle determination module 1001, an acquisition module 1002, and a device determination module 1003.

The angle determination module 1001 is configured to determine a first angle of arrival (AOA) of a signal from a target device in a first direction and a second AOA of the signal in a second direction by the UWB component, the first direction being perpendicular to the second direction.

The acquisition module 1002 is configured to acquire a status of the signal between the terminal and the target device in response to determining that the first AOA and the second AOA are within a first preset angle range.

The device determination module 1003 is configured to determine the target device as a device to be selected according to the status of the signal between the terminal and the target device.

In one embodiment, the acquisition module is configured to determine whether an electromagnetic wave reflected by the target device is in NLoS or LoS transmission according to a first path and a main path of the electromagnetic wave reflected by the target device, and determine the target device as the device to be selected in response to determining that the electromagnetic wave reflected by the target device is in the LoS transmission.

In one embodiment, the acquisition module is configured to determine a target probability that the electromagnetic wave reflected by the target device is in the NLoS transmission according to a result of determining whether the electromagnetic wave reflected by the target device is in the NLoS or LoS transmission for multiple times, and determine the target device as the device to be selected when the target probability is less than a probability threshold.

In one embodiment, the apparatus further includes: a first test module configured to determine whether an electromagnetic wave reflected by a test device is in the NLoS or LoS transmission according to a first path and a main path of the electromagnetic wave reflected by the test device; determine a test probability according to a result of determining whether the electromagnetic wave reflected by the test device is in the NLoS or LoS transmission for multiple times at each of a plurality of test angles; and determine the probability threshold according to the test probability obtained by multiple determinations at each test angle.

In one embodiment, the acquisition module is configured to determine a first received signal strength indication RSSI when a distance from the target device to the terminal is a first distance according to a first preset relational expression between the distance from the target device to the terminal and a RSSI, in which the first preset relational expression is configured to distinguish a RSSI corresponding to a distance from the target device to the terminal when an angle is relatively small from a RSSI corresponding to a distance from the target device to the terminal when the angle is relatively large; determine a second RSSI of an electromagnetic wave reflected by the target device when the distance from the target device to the terminal is the first distance; and determine the target device as the device to be selected in response to determining that the second RSSI is greater than the first RSSI.

In one embodiment, the apparatus further includes: a second test module configured to count a first relation between an RS SI of an electromagnetic wave reflected by a test device and the distance from the target device to the terminal when an electromagnetic wave module directly faces to the test device, and a second relation between an RSSI of the electromagnetic wave reflected by the test device and the distance from the target device to the terminal when the electromagnetic wave module faces away from the test device, and determine the first preset relational expression according to the first relation and the second relation, in which the first preset relational expression is at least configured to distinguish the first relation from the second relation.

In one embodiment, the first preset relational expression includes:

$$Y(d)=-98-10*\ln((d+100)/2000);$$

where Y(d) represents the first RSSI, and d represents the distance from the target device to the terminal.

In one embodiment, the acquisition module is configured to determine a first signal-noise ratio SNR when the distance from the target device to the terminal is a second distance according to a second preset relational expression between the distance from the target device to the terminal and an SNR, in which the second preset relational expression is configured to distinguish an SNR corresponding to the distance from the target device to the terminal when the angle is relatively small from an SNR corresponding to the distance from the target device to the terminal when the angle is relatively large; determine a second SNR of an electromagnetic wave reflected by the target device when the distance from the target device to the terminal is the second distance; and determine the target device as the device to be selected when the second SNR is greater than the first SNR.

In one embodiment, the apparatus further includes: a third test module configured to count a third relation between an SNR of an electromagnetic wave reflected by a test device and the distance from the target device to the terminal at each of a plurality of test angles to obtain a plurality of the third relations corresponding to the plurality of test angles; determine the second preset relational expression according to the plurality of the third relations, in which the second preset relational expression is at least configured to distinguish a third relation corresponding to a relatively small angle from a third relation corresponding to a relatively large angle.

In one embodiment, the second preset relational expression includes:

$$Z(d)=45-18/400*d;$$

where Z(d) represents the first SNR, and d represents the distance from the target device to the terminal.

With respect to the apparatuses in the above embodiments, the specific manners for performing operations for individual modules therein have been described in detail in the embodiments regarding the device determining method, which will not be elaborated herein.

For the apparatus embodiments, since they basically correspond to the method embodiments, the relevant parts can be referred to the partial description of the method embodiments. The apparatus embodiments described above are only illustrative, in which the modules described as separate components may be or may not be physically separated, and the components displayed as modules may be or may not be physical modules, that is, they may be located in one place, or can be distributed to a plurality of network modules. Some or all of the modules can be selected according to actual needs to achieve the purpose of the solution of the present disclosure. Those skilled in the art can understand and implement the present disclosure without creative labor.

An embodiment of the present disclosure further provides an electronic device, including: a processor; and a memory for storing instructions executable by the processor; in which the processor is configured to implement the method described in any of the above embodiments.

An embodiment of the present disclosure also provides a computer-readable storage medium having stored therein instructions that, when executed by a processor, cause steps in the method described in any of the above embodiments to be implemented.

Figure 11:
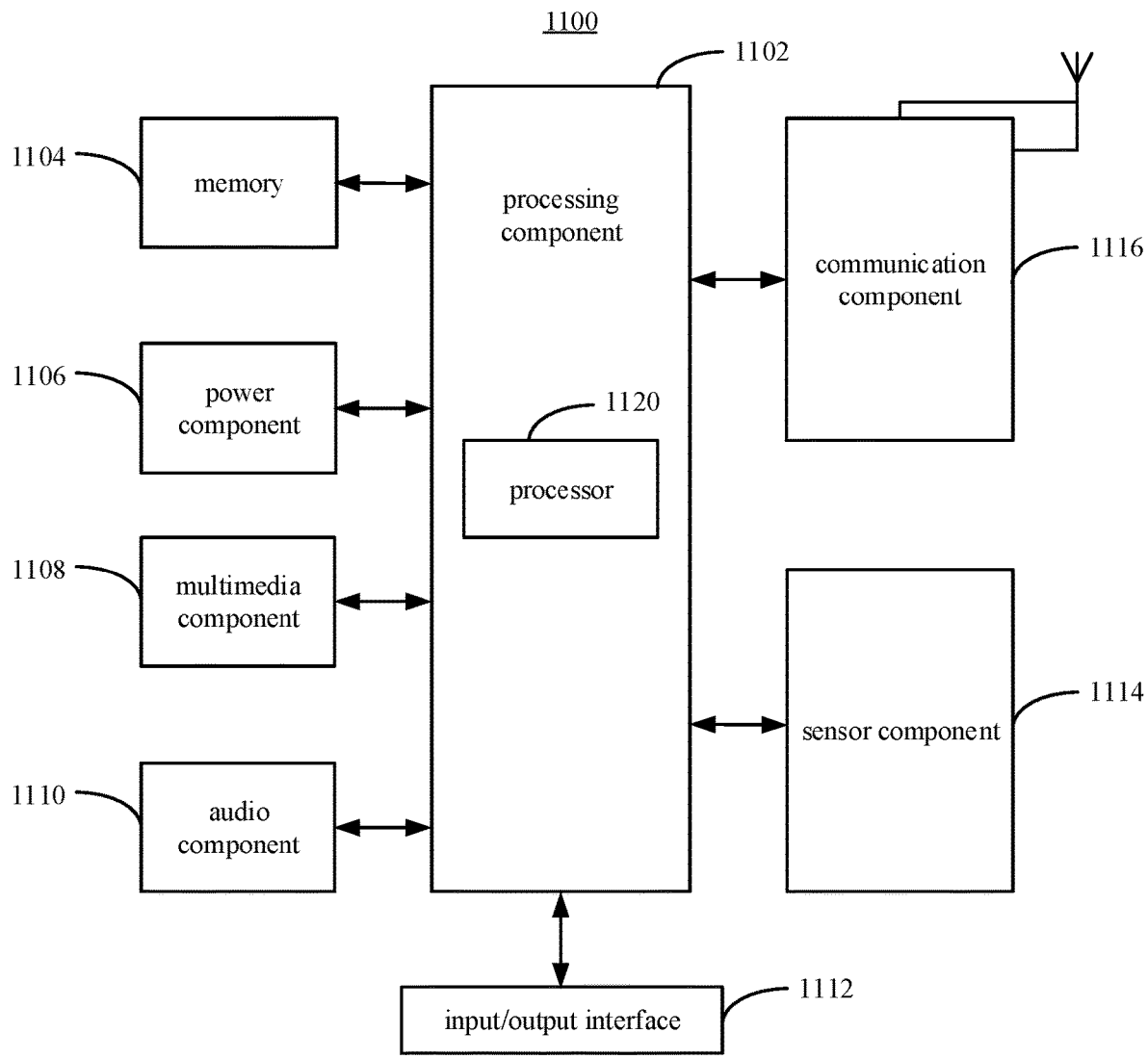
FIG. 11 is a schematic block diagram showing a device determining apparatus according to an embodiment of the present disclosure.

FIG. 11 is a schematic block diagram showing a device determining apparatus 1100 according to an embodiment of the present disclosure. For example, the apparatus 1100 may be an electronic device such as a mobile phone, a computer, a digital broadcast terminal, a messaging device, a game console, a tablet device, a medical device, a fitness device, a personal digital assistant, or the like.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the apparatus 1100, such as the operations associated with display, phone calls, data communications, camera operations, and recording operations. The processing component 1102 can include one or more processors 1120 to execute instructions to perform all or some of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, videos, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 1108 includes a front camera and/or a rear camera. The front camera and/or the rear camera may receive an external multimedia datum while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive an external audio signal when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the apparatus 1100. For instance, the sensor component 1114 may detect an open/closed status of the apparatus 1100, relative positioning of components, e.g., the display and the keypad, of the apparatus 1100, a change in position of the apparatus 1100 or a component of the apparatus 1100, a presence or absence of user contact with the apparatus 1100, an orientation or an acceleration/deceleration of the apparatus 1100, and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wireless, between the apparatus 1100 and other devices. The apparatus 1100 can access a wireless network based on a communication standard, such as WiFi, 2G, or 3G, 4G LTE, 5G NR or a combination thereof. In one embodiment, the communication component 1116 receives a broadcast signal or broadcast associated information from an external broadcast management system via a broadcast channel. In one embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 1104, executable by the processor 1120 in the apparatus 1100, for performing the above-described methods. For example, the non-transitory computer-readable storage medium may be a ROM, a random access memory (RAM), a CD-ROM, a magnetic tape, a floppy disc, an optical data storage device, and the like.

According to a first aspect of embodiments of the present disclosure, there is provided a device determining method applied to a terminal provided with an ultra wide band UWB component, the method including: determining a first angle of arrival (AOA) of a signal from a target device in a first direction and a second AOA of the signal in a second direction by the UWB component, the first direction being perpendicular to the second direction; acquiring a status of the signal between the terminal and the target device in response to determining that the first AOA and the second AOA are within a first preset angle range; and determining the target device as a device to be selected according to the status of the signal between the terminal and the target device.

In some embodiments, determining the target device as the device to be selected according to the status of the signal between the terminal and the target device includes: determining whether an electromagnetic wave reflected by the target device is in non-line-of-sight (NLoS) or line of sight (Los) transmission according to a first path and a main path of the electromagnetic wave reflected by the target device; and determining the target device as the device to be selected in response to determining that the electromagnetic wave reflected by the target device is in the LoS transmission.

In some embodiments, determining the target device as the device to be selected in response to determining that the electromagnetic wave reflected by the target device is in the LoS transmission includes: determining a target probability that the electromagnetic wave reflected by the target device is in the NLoS transmission according to a result of determining whether the electromagnetic wave reflected by the target device is in the NLoS or LoS transmission for multiple times; and determining the target device as the device to be selected in response to determining that the target probability is less than a probability threshold.

In some embodiments, the method further includes: determining whether an electromagnetic wave reflected by a test device is in the NLoS or LoS transmission according to a first path and a main path of the electromagnetic wave reflected by the test device; determining a test probability according to a result of determining whether the electromagnetic wave reflected by the test device is in the NLoS or LoS transmission for multiple times at each of a plurality of test angles; and determining the probability threshold according to the test probability obtained by multiple determinations at each test angle.

In some embodiments, determining the target device as the device to be selected according to the status of the signal between the terminal and the target device includes: determining a first received signal strength indication RSSI when a distance from the target device to the terminal is a first distance according to a first preset relational expression between the distance from the target device to the terminal and a RSSI, in which the first preset relational expression is configured to distinguish a RSSI corresponding to a distance from the target device to the terminal in case of a first angle from a RSSI corresponding to a distance from the target device to the terminal in case of a second angle, the first angle being less than the second angle; determining a second RSSI of an electromagnetic wave reflected by the target device when the distance from the target device to the terminal is the first distance; and determining the target device as the device to be selected in response to determining that the second RSSI is greater than the first RSSI.

In some embodiments, the method further includes: counting a first relation between an RSSI of an electromagnetic wave reflected by a test device and the distance from the target device to the terminal when an electromagnetic wave module directly faces to the test device, and a second relation between an RSSI of the electromagnetic wave reflected by the test device and the distance from the target device to the terminal when the electromagnetic wave module faces away from the test device; and determining the first preset relational expression according to the first relation and the second relation, in which the first preset relational expression is at least configured to distinguish the first relation from the second relation.

In some embodiments, the first preset relational expression includes: $Y(d)=-98-10*\ln((d+100)/2000)$; where $Y(d)$ represents the first RSSI, and d represents the distance from the target device to the terminal.

In some embodiments, determining the target device as the device to be selected according to the status of the signal between the terminal and the target device includes: determining a first signal-noise ratio SNR when a distance from the target device to the terminal is a second distance according to a second preset relational expression between the distance from the target device to the terminal and an SNR, in which the second preset relational expression is configured to distinguish an SNR corresponding to the distance from the target device to the terminal in case of a first angle from an SNR corresponding to the distance from the target device to the terminal in case of a second angle, the first angle being less than the second angle; determining a second SNR of an electromagnetic wave reflected by the target device when the distance from the target device to the terminal is the second distance; and determining the target device as the device to be selected in response to determining that the second SNR is greater than the first SNR.

In some embodiments, the method further includes: counting a third relation between an SNR of an electromagnetic wave reflected by a test device and the distance from the target device to the terminal at each of a plurality of test angles to obtain a plurality of the third relations corresponding to the plurality of test angles; determining the second preset relational expression according to the plurality of the third relations, in which the second preset relational expression is at least configured to distinguish a third relation corresponding to a first angle from a third relation corresponding to a second angle, the first angle being less than the second angle.

In some embodiments, the second preset relational expression includes: $Z(d)=45-18/400*d$; where $Z(d)$ represents the first SNR, and d represents the distance from the target device to the terminal.

According to a second aspect of embodiments of the present disclosure, there is provided a device determining apparatus, applied to a terminal provided with an ultra wide band UWB component, the apparatus including: an angle determination module configured to determine a first angle of arrival (AOA) of a signal from a target device in a first direction and a second AOA of the signal in a second direction by the UWB component, the first direction being perpendicular to the second direction; an acquisition module configured to acquire a status of the signal between the terminal and the target device in response to determining that the first AOA and the second AOA are within a first preset angle range; and a device determination module configured to determine the target device as a device to be selected according to the status of the signal between the terminal and the target device.

In some embodiments, the acquisition module is configured to determine whether an electromagnetic wave reflected by the target device is in NLoS or LoS transmission according to a first path and a main path of the electromagnetic wave reflected by the target device, and determine the target device as the device to be selected in response to determining that the electromagnetic wave reflected by the target device is in the LoS transmission.

In some embodiments, the acquisition module is configured to determine a target probability that the electromagnetic wave reflected by the target device is in the NLoS transmission according to a result of determining whether the electromagnetic wave reflected by the target device is in the NLoS or LoS transmission for multiple times, and determine the target device as the device to be selected in response to determining that the target probability is less than a probability threshold.

In some embodiments, the apparatus further includes: a first test module configured to determine whether an electromagnetic wave reflected by a test device is in the NLoS or LoS transmission according to a first path and a main path of the electromagnetic wave reflected by the test device, determine a test probability according to a result of determining whether the electromagnetic wave reflected by the test device is in the NLoS or LoS transmission for multiple times at each of a plurality of test angles; and determine the probability threshold according to the test probability obtained by multiple determinations at each test angle.

In some embodiments, the acquisition module is configured to: determine a first received signal strength indication RS SI when a distance from the target device to the terminal is a first distance according to a first preset relational expression between the distance from the target device to the terminal and a RSSI, in which the first preset relational expression is configured to distinguish a RSSI corresponding to a distance from the target device to the terminal in case of a first angle from a RSSI corresponding to a distance from the target device to the terminal in case of a second angle, the first angle being less than the second angle; determine a second RSSI of an electromagnetic wave reflected by the target device when the distance from the target device to the terminal is the first distance; and determine the target device as the device to be selected in response to determining that the second RSSI is greater than the first RSSI.

In some embodiments, the apparatus further includes: a second test module configured to count a first relation between an RSSI of an electromagnetic wave reflected by a test device and the distance from the target device to the terminal when an electromagnetic wave module directly faces to the test device, and a second relation between an RSSI of the electromagnetic wave reflected by the test device and the distance from the target device to the terminal when the electromagnetic wave module faces away from the test device, and determine the first preset relational expression according to the first relation and the second relation, in which the first preset relational expression is at least configured to distinguish the first relation from the second relation.

In some embodiments, the first preset relational expression includes: $Y(d)=-98-10n((d+100)/2000)$; where $Y(d)$ represents the first RSSI, and d represents the distance from the target device to the terminal.

In some embodiments, the acquisition module is configured to: determine a first signal-noise ratio SNR when the distance from the target device to the terminal is a second distance according to a second preset relational expression between the distance from the target device to the terminal and an SNR, in which the second preset relational expression is configured to distinguish an SNR corresponding to a distance from the target device to the terminal in case of a first angle from an SNR corresponding to a distance from the target device to the terminal in case of a second angle, the first angle being less than the second angle; determine a second SNR of an electromagnetic wave reflected by the target device when the distance from the target device to the terminal is the second distance; and determine the target device as the device to be selected in response to determining that the second SNR is greater than the first SNR.

In some embodiments, the apparatus further includes: a third test module configured to count a third relation between an SNR of an electromagnetic wave reflected by a test device and the distance from the target device to the terminal at each of a plurality of test angles to obtain a plurality of the third relations corresponding to the plurality of test angles; and determine the second preset relational expression according to the plurality of the third relations, in which the second preset relational expression is at least configured to distinguish a third relation corresponding to a first angle from a third relation corresponding to a second angle, the first angle being less than the second angle.

In some embodiments, the second preset relational expression includes: $Z(d)=45-18/400*d$; where $Z(d)$ represents the first SNR, and d represents the distance from the target device to the terminal.

According to a third aspect of embodiments of the present disclosure, there is provided an electronic device, including: a processor; and a memory for storing instructions executable by the processor; in which the processor is configured to implement the above method.

According to a fourth aspect of embodiments of the present disclosure, there is provided a computer-readable storage medium having stored therein instructions that, when executed by a processor, cause steps in the above method to be implemented.

Other embodiments of the present disclosure will be apparent to those skilled in the art from consideration of the specification and practice of the present disclosure described here. This application is intended to cover any variations, uses, or adaptations of the present disclosure following the general principles thereof and including such departures from the present disclosure as come within known or customary practice in the art. It is intended that the specification and examples be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A device determining method, applied to a terminal provided with an ultra wide band (UWB) component, the method comprising:
    determining a first angle of arrival (AOA) of a signal from a target device in a first direction and a second AOA of the signal in a second direction by the UWB component, the first direction being perpendicular to the second direction;
    acquiring a status of the signal between the terminal and the target device in response to determining that the first AOA and the second AOA are within a first preset angle range; and
    determining the target device as a device to be selected according to the status of the signal between the terminal and the target device;
    wherein determining the target device as the device to be selected according to the status of the signal between the terminal and the target device comprises:
    determining whether an electromagnetic wave reflected by the target device is in non line of sight (NLoS) or line of sight (LoS) transmission according to a first path and a main path of the electromagnetic wave reflected by the target device; and
    determining the target device as the device to be selected in response to determining that the electromagnetic wave reflected by the target device is in the LoS transmission;
    wherein determining the target device as the device to be selected in response to determining that the electromagnetic wave reflected by the target device is in the LoS transmission comprises:
    determining a target probability that the electromagnetic wave reflected by the target device is in the NLOS transmission according to a result of determining whether the electromagnetic wave reflected by the target device is in the NLOS or LoS transmission for multiple times; and
    determining the target device as the device to be selected in response to determining that the target probability is less than a probability threshold.

2. The method of claim 1, further comprising:
    determining whether an electromagnetic wave reflected by a test device is in the NLOS or LoS transmission according to a first path and a main path of the electromagnetic wave reflected by the test device;
    determining a test probability according to a result of determining whether the electromagnetic wave reflected by the test device is in the NLOS or LoS transmission for multiple times at each of a plurality of test angles; and
    determining the probability threshold according to the test probability obtained by multiple determinations at each test angle.

3. The method of claim 1, wherein determining the target device as the device to be selected according to the status of the signal between the terminal and the target device comprises:
    determining a first received signal strength indication (RSSI) when a distance from the target device to the terminal is a first distance according to a first preset relational expression between the distance from the target device to the terminal and a RSSI, wherein the first preset relational expression is configured to distinguish a RSSI corresponding to a distance from the target device to the terminal in case of a first angle from a RSSI corresponding to a distance from the target device to the terminal in case of a second angle, the first angle being less than the second angle;
    determining a second RSSI of an electromagnetic wave reflected by the target device when the distance from the target device to the terminal is the first distance; and
    determining the target device as the device to be selected in response to determining that the second RSSI is greater than the first RSSI.

4. The method of claim 3, further comprising:
counting a first relation between an RSSI of an electromagnetic wave reflected by a test device and the distance from the target device to the terminal when an electromagnetic wave module directly faces to the test device, and a second relation between an RSSI of the electromagnetic wave reflected by the test device and the distance from the target device to the terminal when the electromagnetic wave module faces away from the test device; and
determining the first preset relational expression according to the first relation and the second relation, wherein the first preset relational expression is at least configured to distinguish the first relation from the second relation.

5. The method of claim 4, wherein the first preset relational expression comprises:

$$Y(d)=-98-10*\ln((d+100)/2000);$$

where Y(d) represents the first RSSI, and d represents the distance from the target device to the terminal.

6. The method of claim 1, wherein determining the target device as the device to be selected according to the status of the signal between the terminal and the target device comprises:
determining a first signal-noise ratio (SNR) corresponding to a second distance from the target device to the terminal according to a second preset relational expression between the distance from the target device to the terminal and an SNR, wherein the second preset relational expression is configured to distinguish an SNR corresponding to the distance from the target device to the terminal in case of a first angle from an SNR corresponding to the distance from the target device to the terminal in case of a second angle, the first angle being less than the second angle;
determining a second SNR of an electromagnetic wave reflected by the target device when the distance from the target device to the terminal is the second distance; and
determining the target device as the device to be selected in response to determining that the second SNR is greater than the first SNR.

7. The method of claim 6, further comprising:
counting a third relation between an SNR of an electromagnetic wave reflected by a test device and the distance from the target device to the terminal at each of a plurality of test angles to obtain a plurality of the third relations corresponding to the plurality of test angles; and
determining the second preset relational expression according to the plurality of the third relations, wherein the second preset relational expression is at least configured to distinguish a third relation corresponding to a first angle from a third relation corresponding to a second angle, the first angle being less than the second angle.

8. The method of claim 7, wherein the second preset relational expression comprises:

$$Z(d)=45-18/400*d;$$

where Z(d) represents the first SNR, and d represents the distance from the target device to the terminal.

9. An electronic device, comprising:
a processor; and
a memory for storing instructions executable by the processor;

wherein the processor is configured to:
determine a first angle of arrival (AOA) of a signal from a target device in a first direction and a second AOA of the signal in a second direction by a UWB component, the first direction being perpendicular to the second direction;
acquire a status of the signal between a terminal and the target device in response to determining that the first AOA and the second AOA are within a first preset angle range; and
determine the target device as a device to be selected according to the status of the signal between the terminal and the target device;
wherein the processor is configured to:
determine whether an electromagnetic wave reflected by the target device is in non line of sight (NLoS) or line of sight (LoS) transmission according to a first path and a main path of the electromagnetic wave reflected by the target device; and
determine the target device as the device to be selected in response to determining that the electromagnetic wave reflected by the target device is in the LoS transmission;
wherein the processor is configured to:
determine a target probability that the electromagnetic wave reflected by the target device is in the NLOS transmission according to a result of determining whether the electromagnetic wave reflected by the target device is in the NLOS or LoS transmission for multiple times; and
determine the target device as the device to be selected in response to determining that the target probability is less than a probability threshold.

10. The electronic device of claim 9, wherein the processor is configured to:
determine whether an electromagnetic wave reflected by a test device is in the NLOS or LOS transmission according to a first path and a main path of the electromagnetic wave reflected by the test device;
determine a test probability according to a result of determining whether the electromagnetic wave reflected by the test device is in the NLOS or LoS transmission for multiple times at each of a plurality of test angles; and
determine the probability threshold according to the test probability obtained by multiple determinations at each test angle.

11. The electronic device of claim 9, wherein the processor is configured to:
determine a first received signal strength indication RSSI when a distance from the target device to the terminal is a first distance according to a first preset relational expression between the distance from the target device to the terminal and a RSSI, wherein the first preset relational expression is configured to distinguish a RSSI corresponding to a distance from the target device to the terminal in case of a first angle from a RSSI corresponding to a distance from the target device to the terminal in case of a second angle, the first angle being less than the second angle;
determine a second RSSI of an electromagnetic wave reflected by the target device when the distance from the target device to the terminal is the first distance; and
determine the target device as the device to be selected in response to determining that the second RSSI is greater than the first RSSI.

12. The electronic device of claim 11, wherein the processor is configured to:
- count a first relation between an RSSI of an electromagnetic wave reflected by a test device and the distance from the target device to the terminal when an electromagnetic wave module directly faces to the test device, and a second relation between an RSSI of the electromagnetic wave reflected by the test device and the distance from the target device to the terminal when the electromagnetic wave module faces away from the test device; and
- determine the first preset relational expression according to the first relation and the second relation, wherein the first preset relational expression is at least configured to distinguish the first relation from the second relation.

13. The electronic device of claim 12, wherein the first preset relational expression comprises:

$$Y(d)=-98-10*\ln((d+100)/2000);$$

where Y(d) represents the first RSSI, and d represents the distance from the target device to the terminal.

14. The electronic device of claim 9, wherein the processor is configured to:
- determine a first signal-noise ratio SNR corresponding to a second distance from the target device to the terminal according to a second preset relational expression between the distance from the target device to the terminal and an SNR, wherein the second preset relational expression is configured to distinguish an SNR corresponding to the distance from the target device to the terminal in case of a first angle from an SNR corresponding to the distance from the target device to the terminal in case of a second angle, the first angle being less than the second angle;
- determine a second SNR of an electromagnetic wave reflected by the target device when the distance from the target device to the terminal is the second distance; and
- determine the target device as the device to be selected in response to determining that the second SNR is greater than the first SNR.

15. The electronic device of claim 14, wherein the processor is configured to:
- count a third relation between an SNR of an electromagnetic wave reflected by a test device and the distance from the target device to the terminal at each of a plurality of test angles to obtain a plurality of the third relations corresponding to the plurality of test angles; and
- determine the second preset relational expression according to the plurality of the third relations, wherein the second preset relational expression is at least configured to distinguish a third relation corresponding to a first angle from a third relation corresponding to a second angle, the first angle being less than the second angle,
- wherein the second preset relational expression comprises:

$$Z(d)=45-18/400*d;$$

where Z (d) represents the first SNR, and d represents the distance from the target device to the terminal.

16. A non-transitory computer-readable storage medium having stored therein instructions that, when executed by a processor, cause the processor to:
- determine a first angle of arrival (AOA) of a signal from a target device in a first direction and a second AOA of the signal in a second direction by a UWB component, the first direction being perpendicular to the second direction;
- acquire a status of the signal between a terminal and the target device in response to determining that the first AOA and the second AOA are within a first preset angle range; and
- determine the target device as a device to be selected according to the status of the signal between the terminal and the target device;
- wherein determining the target device as the device to be selected according to the status of the signal between the terminal and the target device comprises:
- determining whether an electromagnetic wave reflected by the target device is in non line of sight (NLoS) or line of sight (LoS) transmission according to a first path and a main path of the electromagnetic wave reflected by the target device; and
- determining the target device as the device to be selected in response to determining that the electromagnetic wave reflected by the target device is in the LoS transmission;
- wherein determining the target device as the device to be selected in response to determining that the electromagnetic wave reflected by the target device is in the LoS transmission comprises:
- determining a target probability that the electromagnetic wave reflected by the target device is in the NLOS transmission according to a result of determining whether the electromagnetic wave reflected by the target device is in the NLOS or LoS transmission for multiple times; and
- determining the target device as the device to be selected in response to determining that the target probability is less than a probability threshold.

\* \* \* \* \*